United States Patent [19]

Fudickar et al.

[11] Patent Number: 4,557,791
[45] Date of Patent: Dec. 10, 1985

[54] BELT PRESS WITH UPPER AND LOWER BEND COMPENSATORS

[75] Inventors: Harald Fudickar, Wuppertal; Peter Thies, Ennepetal, both of Fed. Rep. of Germany

[73] Assignee: Wagener Schwelm GmbH & Co., Schwelm, Fed. Rep. of Germany

[21] Appl. No.: 618,502

[22] Filed: Jun. 8, 1984

[30] Foreign Application Priority Data

Jun. 9, 1983 [DE] Fed. Rep. of Germany ....... 3320783

[51] Int. Cl.$^4$ ............................................ B30B 15/06
[52] U.S. Cl. ................................. 156/580; 100/93 P; 100/269 A; 100/270; 156/304.6; 156/502; 156/583.1
[58] Field of Search .......... 100/258 R, 258 A, 269 A, 100/270, 290, 295, 93 P; 156/304.1, 304.6, 502, 583.1, 580; 425/338, 343, 384, 394, 406, 410

[56] References Cited

U.S. PATENT DOCUMENTS

| | | | |
|---|---|---|---|
| 4,388,860 | 6/1983 | Thies | 100/270 |
| 4,393,674 | 7/1983 | Rasmussen | 73/49.1 X |
| 4,423,674 | 1/1984 | Thies | 100/258 A X |
| 4,426,573 | 1/1984 | Fudickar et al. | 53/463 X |

Primary Examiner—Billy J. Wilhite
Attorney, Agent, or Firm—Karl F. Ross; Herbert Dubno

[57] ABSTRACT

A belt press is formed of a longitudinal row of upright and abutting press frames each comprising a plurality of upper and a plurality of lower traverses respectively having lower and upper traverse faces, upper and lower press platens carried on and between the traverses and having respective upper and lower platen faces respectively confronting the lower and upper traverse faces, and mechanical actuators including bolts engaged between the traverses for displacing the traverses toward each other and thereby pressing the platens against a belt engaged therebetween with a pressure sufficient to deform the lower traverse. A lower bend-compensating element having a pair of nonparallel upper and lower surfaces is engaged between the lower platen face and the respective confronting traverse face. A hydraulic force-transmitter is engaged between the upper platen face and the lower traverse face. The bend-compensating element is shaped such that the lower platen remains planar and in direct contact through the bend-compensating element with the lower traverse.

4 Claims, 4 Drawing Figures

BELT PRESS WITH UPPER AND LOWER BEND COMPENSATORS

FIELD OF THE INVENTION

The present invention relates to a belt press. More particularly this invention concerns a press for the hot joining or repairing or a wide conveyor belt.

BACKGROUND OF THE INVENTION

A press used for joining and repairing wide flat belts has a plurality of upper and a plurality of lower traverses respectively having lower and upper traverse faces and upper and lower press platens carried on and between the traverses and having respective upper and lower platen faces respectively confronting the lower and upper traverse faces. Upright tie rods have their upper ends secured in the upper traverse and their lower ends in the lower traverse and can be tightened to move the two platens into a starting position. A belt to be pressed is engaged between the platens.

A bend-compensating element having a pair of nonparallel upper and lower surfaces is engaged between one of the platen faces and the confronting traverse face and a hydraulic actuator is normally braced between the bend-compensating element and one of the respective press and platen faces. This actuator can be expanded to move the respective platen toward the other platen.

This bend-compensating element, as defined in commonly owned U.S. Pat. No. 4,423,674 is shaped to conform to the bend line of the platen. This line is the curved line a straight line through the press forms when the press is at its standard operating pressure. Normally this element is formed with a curved surface shaped like the bend line, and with a planar surface, but it distorts in use to have two curved surfaces.

Thus force transmission to the press platens is fairly even, as when the press is at the standard operating pressure the bend compensator will fill the space between each bowed traverse and the respective platens which are planar. Nonetheless it has been found that even such presses typically deform somewhat in use.

OBJECTS OF THE INVENTION

It is therefore an object of the present invention to provide an improved belt press.

Another object is the provision of such a belt press which overcomes the above-given disadvantages so that the press platens become perfectly planar when the press closes.

SUMMARY OF THE INVENTION

A belt press according to this invention is formed of a longitudinal row of upright and abutting press frames each comprising a plurality of upper and a plurality of lower traverses respectively having lower and upper traverse faces, upper and lower press platens carried on and between the traverses and having respective upper and lower platen faces respectively confronting the lower and upper traverse faces, and mechanically actuated means including bolts engaged between the traverses for displacing the traverses toward each other and thereby pressing the platens against a belt engaged therebetween with a pressure sufficient to deform the lower traverse. A lower bend-compensating element having a pair of nonparallel upper and lower surfaces is engaged between the lower platen face and the respective confronting traverse face. A hydraulic force-transmitter is engaged between the upper platen face and the lower traverse face. The bend-compensating element is shaped such that the lower platen remains planar and in direct contact through the bend-compensating element with the lower traverse.

With this arrangement the lower platen will be perfectly planar when the press is at its standard operating pressure, as the shape of the bend-compensating element is such that it engages the respective traverse and platen faces in surface contact during such operation.

According to another feature of this invention the hydraulic force transmitter is a plurality of diametrally compressible but circumferentially unstretchable hydraulic hoses forming at least one substantially closed chamber of a predetermined maximum volume, and of a body of a liquid in the chamber. Such an arrangement ensures perfectly uniform force distribution over the entire surface of the press. The chambers can all be connected together and filled partially with a liquid for force transmission only. It is also possible to connect these chambers all to a pump for use of these hoses as part of the mechanical actuator.

The press according to this invention can also have an upper bend-compensating element having a pair of nonparallel upper and lower surfaces and engaged between the upper platen face and the respective confronting traverse face. Such an arrangement is particularly effective combined with a hydraulic force-distributing system.

In addition in accordance with this invention the lower bend-compensating element is removably mounted in the press. Thus when the process is changed somewhat and a different pressure is used, this element is switched for one of the appropriate shape corresponding to the new bend line.

In unstressed condition, that is when the press is not working, the lower bend-compensating element has a planar upper element surface flatly engaging the lower platen face and a curved and downwardly convex lower surface engaging the upper traverse face generally in line contact.

DESCRIPTION OF THE DRAWING

The above and other features and advantages will become more readily apparent from the following, in which.

SPECIFIC DESCRIPTION

Figure 1:
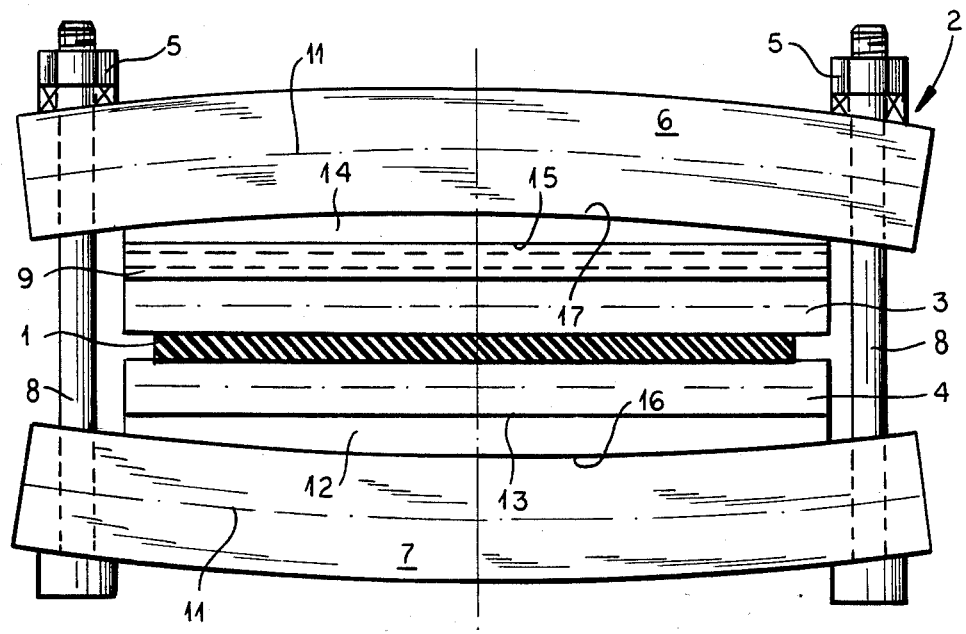
FIG. 1 is a vertical cross section through the press of this invention.
Figure 2:
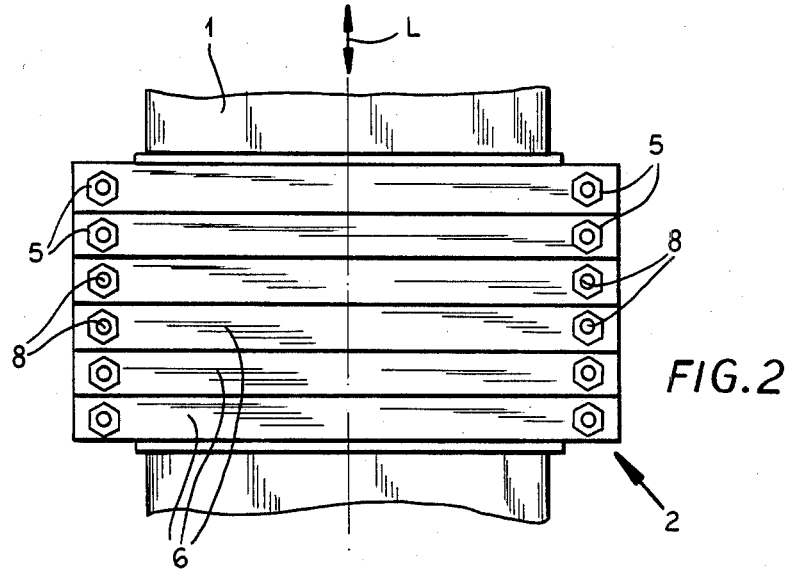
FIG. 2 is small-scale top view of the press of the present invention.
Figure 3:
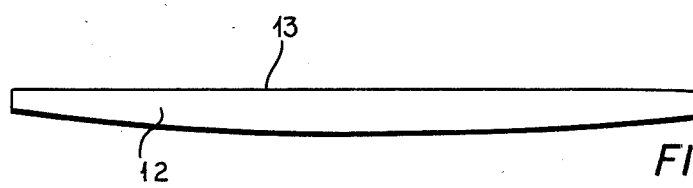
FIG. 3 is a side view of the lower bend compensator according to the invention.
Figure 4:
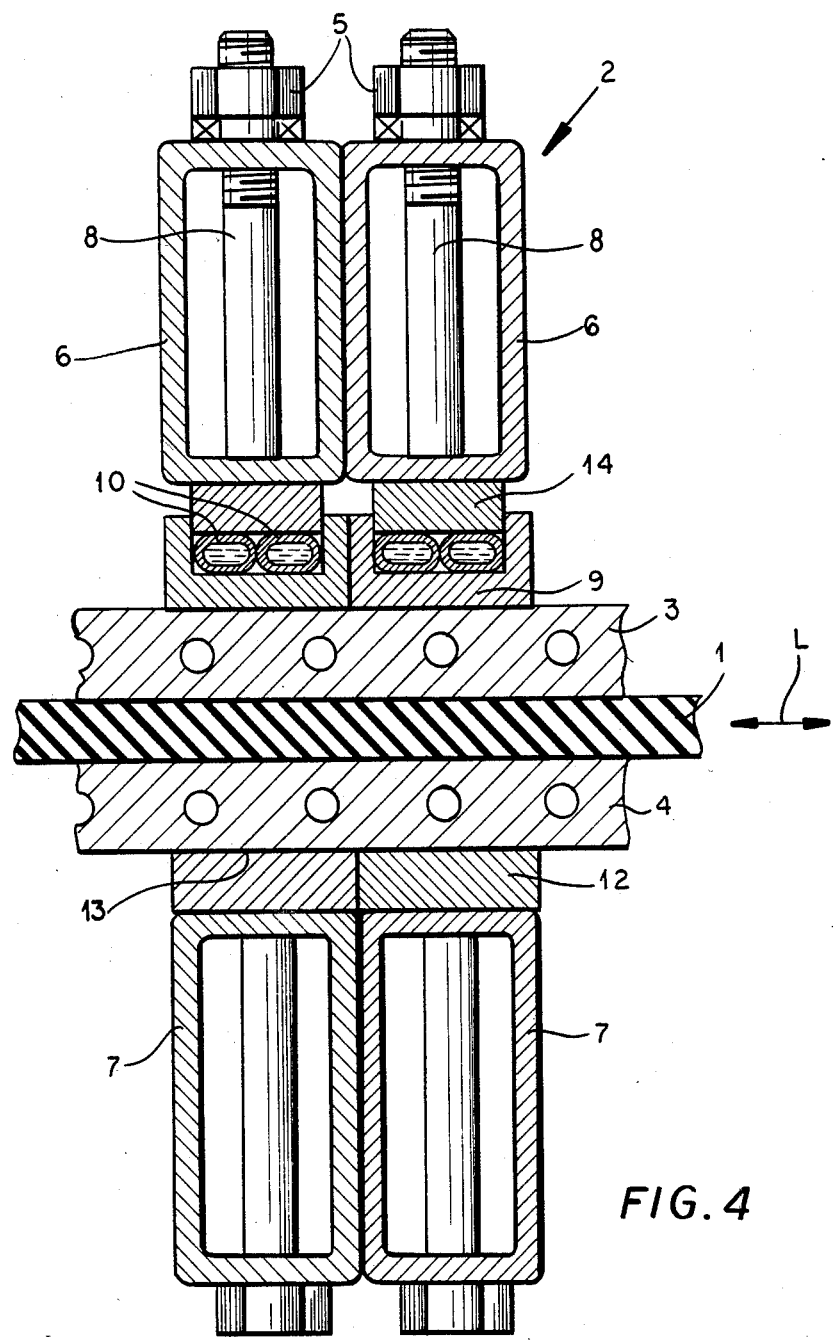
FIG. 4 is a large-scale vertical longitudinal section through the inventive press.

As seen in FIGS. 1, 2, and 4, a press according to this invention is formed of two or more identical and upright press frames 2 all aligned in a longitudinal direction L abutting one another. In this manner, as described in jointly filed application Ser. No. 618,503, it is possible to make a press of any desired length.

Each frame comprises rectangular-section box-beam traverses 6 and 7 that extend horizontally transverse to the direction L. Tie-rod bolts 8 with nuts 5 pass through the outer ends of the traverses 6 and 7 and solidly prevent them from moving vertically apart and the nuts 5 can be turned to close the press. The traverses 6 bear downward via respective upper force-transmitting pressure plates or bars 9 on an upper press platen 3 while the lower traverses 7 bear upward against a lower platen 4. These platens 3 and 4 are formed with throughgoing passages so steam or the like can be passed through them to heat them. They can also be provided with heaters such as described in the application cited immediately above and in application Ser. No. 329,571 filed Dec. 10, 1981 by C. Fudickar (now U.S. Pat. No. 4,426,573). The upper bar 9 bears via a hydraulic actuator 10 and a bend-compensating bar 14 of standard construction on the the upper traverse 6. Similarly the lower platen 4 bears via a bend-compensating bar 12 on the lower traverse 7.

The actuator 10 is here constituted much as described in U.S. Pat. Nos. 4,393,766 and 4,423,674 as well as in copending patent application Ser. No. 326,892 of P. Thies and in U.S. Pat. No. 4,388,860. The pressing bar 9 is of U-section with a flat base that bears on the upper platen 3 and a pair of sides that flank and laterally contain the actuator, which is formed of two actuator hoses 10. All the chambers of the hoses 10 of the press are connected together to a common pump so the entire press exerts the same pressure on the workpiece 1. The hoses 10 are diametrally compressible but circumferentially unstretchable and have in uncompressed condition a predetermined hose diameter although they are partially flattened between the plate 9 and the confronting bar 14 in use. In addition as described in the above-mentioned patent documents, the hoses 10 can be partially filled with air or another compressible fluid so that perfectly even pressure will be ensured.

Straight lines through the traverses 6 and 7 become the curved bend lines 11 seen in FIG. 1 when the press is at full pressure. The bend compensators 12 and 14 have planar upper and lower surfaces 13 and 15, respectively, and curved lower and upper surfaces 16 and 17, respectively, whose curvature is the same as that of the bend lines 11 and which are normally part-cylindrical with axial centers of curvature extending in the direction L.

The use of the hydraulic hoses 10 ensures that the pressure that the upper traverses 6 exert downward when the nuts 5 are tightened is uniform. Thus the two bend compensators 12 and 14 will ensure, as shown in somewhat exaggerated fashion in FIG. 1, that the platens 3 and 4 will be perfectly planar when the press is under standard operating pressure.

We claim:

1. A belt press formed of a longitudinal row of upright and abutting press frames each comprising:
   a plurality of upper and a plurality of lower traverses respectively having lower and upper traverse faces;
   upper and lower press platens carried on and between the respective traverses and having respective upper and lower platen faces respectively confronting the lower and upper traverse faces, whereby a belt to be pressed can be engaged between the platens;
   a lower bend-compensating element operatively engaged between the lower face of the lower platen and the respective confronting upper face of the lower traverse;
   an upper bend-compensating element operatively engaged between the upper face of the upper platen and the respective confronting lower face of the upper traverse, the bend-compensating elements each having in unstressed condition a planar element surface operatively flatly engaging the respective platen face and a curved surface engaging the respective traverse face generally in line contact;
   a hydraulic force transmitter engaged between one of the platens and the planar element surface of the respective bend-compensating element; and
   mechanically actuated means including bolts engaged between the traverses for displacing the traverses toward each other and thereby pressing the platens against a belt engaged therebetween with a pressure sufficient to deform the lower traverse, the bend-compensating elements being shaped such that the respective platens remain planar and in direct contact through the respective bend-compensating elements with the respective traverses.

2. The belt press defined in claim 1 wherein the hydraulic force transmitter is a plurality of diametrally compressible but circumferentially unstretchable hydraulic hoses forming at least one substantially closed chamber of a predetermined maximum volume, and of a body of a liquid in the chamber.

3. The belt press defined in claim 2 wherein the liquid only partially fills the chamber, and the chambers of all the hoses are interconnected to form a single such chamber of maximum volume when the hoses are not compressed.

4. The belt press defined in claim 1 wherein the lower bend-compensating element is removably mounted in the press.

* * * * *